May 13, 1952     F. J. GROVEN     2,596,770
INDUCTION HARDENING FIXTURE

Filed Sept. 29, 1948     3 Sheets-Sheet 1

F. J. GROVEN
*INVENTOR.*

BY E. C. McRae
J. R. Faulkner
T. H. Oster
    ATTORNEYS

May 13, 1952  F. J. GROVEN  2,596,770
INDUCTION HARDENING FIXTURE
Filed Sept. 29, 1948  3 Sheets-Sheet 2

F. J. GROVEN
INVENTOR.

BY
ATTORNEYS

May 13, 1952 F. J. GROVEN 2,596,770
INDUCTION HARDENING FIXTURE
Filed Sept. 29, 1948 3 Sheets-Sheet 3
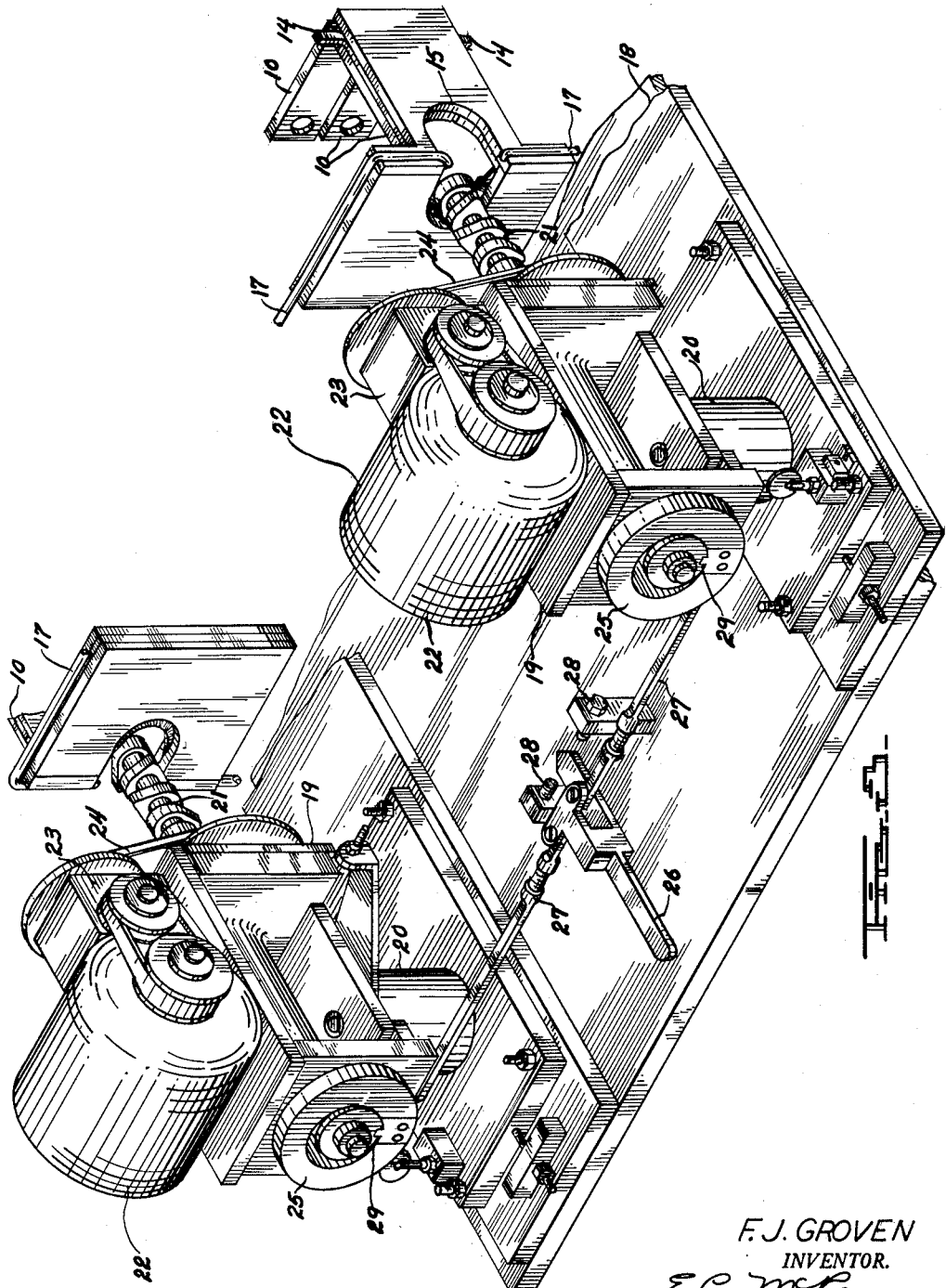
F. J. GROVEN
INVENTOR.
BY E. C. McRae
J. L. Faulkner
T. H. Oster
ATTORNEYS Patented May 13, 1952

2,596,770

UNITED STATES PATENT OFFICE 2,596,770

INDUCTION HARDENING FIXTURE

Fredrick J. Groven, Highland Park, Mich., assignor to Ford Motor Company, Dearborn, Mich., a corporation of Delaware Application September 29, 1948, Serial No. 51,834

1 Claim. (Cl. 219—47)

This application is concerned with the art of heat treating and more particularly with an apparatus intended for the repetitious localized heating and hardening of similar work pieces. The heating medium to be employed is high frequency electrical energy.

One object of this invention is to enable similar parts to be hardened with uniform success by semi-skilled or unskilled labor.

It is a further object of this invention to reduce the cost of such a hardening operation by increasing the output possible by an operator.

It is a further object of this invention to provide an inductor adaptable to hardening locally complicated shapes such as camshafts and crankshafts without the necessity of resorting to moving inductors or split inductors.

It is a further object of this invention to provide an inductor capable of heating and quenching a work piece without the necessity of moving the work piece.

It is a further object of this invention to provide a fixture capable of uniformly hardening a camshaft or crankshaft with a minimum of operator attention and effort.

With these and other objects in view, the invention comprises the arrangements, constructions and combinations of the various elements of the structure described in the specification, claimed in the claim and illustrated in the drawings in which:

Figure 3 is a perspective view showing two inductors arranged in a fixture for the simultaneous handling of two camshafts.

It is often desired to heat treat inductively metal articles so shaped that it is impossible to insert them into a conventional coiled inductor. As typical of such articles may be cited internal combustion engine camshafts and crankshafts. One expedient adopted to circumvent this difficulty has been the use of split coil inductors. These have introduced the difficulties and uncertainties of movable contacts which are called upon to transmit very heavy currents since at best only a few turns and preferably one turn may be used in such an inductor.

Figure 1:
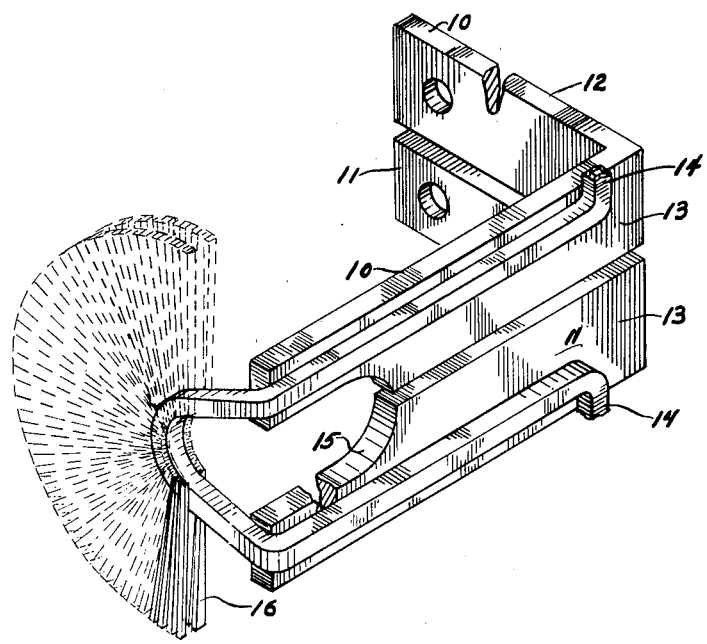
Figure 1 is a perspective view of the inductor showing only the metal parts.

In an effort to obviate these difficulties, the inductor depicted in Figure 1 has been developed. Figure 1 shows only the metallic parts of this inductor. In Figure 1, conductors 10 and 11 are bolted to the secondary of a transformer employed to reduce the voltage generated by the high frequency source. Faces 12 of conductors 10 and 11 are in actual contact with such secondary. Conductors 10 and 11 are formed so that faces 13 are disposed at right angles to faces 12. Conduit 14 is brazed to faces 13 of conductors 10 and 11. This conduit is designed to conduct a stream of cooling water and is preferably made rectangular in section for a purpose which will become apparent as the description proceeds. Shortly beyond the outer ends of conductors 10 and 11 and remote from faces 12, conduit 14 is bent at right angles to faces 13 and parallel to faces 12. The portion of the conduit 14 bridging conductors 10 and 11 is given a shape approximating the letter U. The ends of conductors 10 and 11 are cut away to form opening 15. Laminations 16 are arranged radially about the lower portion of the U-shaped part of conduit 14. It is preferred to fabricate these laminations from high silicon transformer steel to minimize heating and the resultant losses. The ends of these laminations 16 adjacent conduit 14 are milled out to give a snug fit against conduit 14. This milling is deep enough to permit the inner ends of laminations 16 to extend beyond the inner face of conduit 14.

Figure 2:
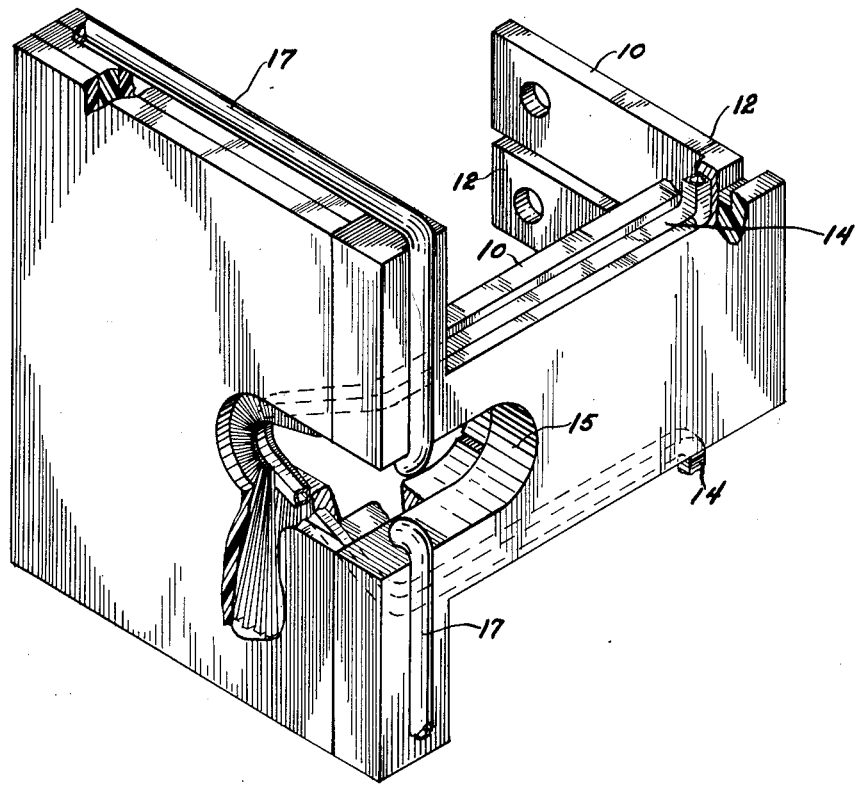
Figure 2 is a perspective view, partially in section, showing the metal parts of the inductor of Figure 1 assembled with the requisite insulating material and quenching conduits.

Figure 2 is similar to Figure 1 and depicts the inductor shown in Figure 1 after the electrical insulating material and quenching pipes have been applied. It is preferred to insulate the electrical conductors of the inductor with the conventional fibre sheet insulation. Figure 2 is thought to be self-explanatory in this respect. Quench pipes 17 have been added to rapidly abstract heat from the heated work piece. These pipes are arranged to impinge a stream of water or other coolant forcibly upon the heated work piece before it is moved from the position in which it has been inductively heated.

Figure 3 is a perspective view of a complete hardening fixture into which have been incorporated a pair of inductors of the construction shown in Figures 1 and 2. This fixture, with the exception of the inductors, is assembled on a base plate 18. The inductors are mounted upon an auxiliary support which is preferably the secondary of the high frequency transformer. The fixture is provided with two work holders, generally indicated at 19, and which are pivotally mounted on posts 20. The work pieces shown are camshafts 21. Work holders 19 are provided with motors 22 which drive speed reducers 23.

Speed reducers 23 in turn motivate belts 24. Work piece receivers 25 are arranged as shown to enclose the camshafts 21 over a portion of their length and to be rotated by belt 24. The axes of revolution of work piece receivers 25 is coincident with the axes of the portion of the cam which is to be hardened. Thus the camshafts 25 are secured in a position to be rotated in proximity to the inner ends of laminations 16. Work piece receivers 25 are provided with keys 29 designed to coact with a slot provided in camshafts 21 to assure the proper angular relationship of the camshafts and the work piece receivers.

Lever 26 is provided for manually simultaneously pivoting work holders 19 upon posts 20 through linkage 27. The movement of lever 26 is limited by set screws 28 by means of which the working position of work holder 19 may be accurately determined.

As shown in Figure 3, lever 26, linkage 27 and work holders 19 are shown in an intermediate position. Assuming an empty fixture, operation is started by throwing lever 26 all of the way to the right and loading an unhardened camshaft 21 into work holder 19 on the right side. The lever 26 is then thrown to the left which causes the work holder 19 to pivot on post 20 and thrust the camshaft on the right side into proximity with the laminations 16. This movement of the lever causes the empty work holder 19 to rotate in the same direction as the loaded work holder 19 so that a camshaft loaded into the empty work holder 19 will clear the inductor in which it is to be hardened. While the second (left) work holder is being loaded, the inductor serving the first (right) loaded work holder is energized as is motor 22 and work piece receiver 23. This causes the camshaft to be rotated in close proximity to the laminations and the camshaft completes the magnetic circuit of which the laminations form a part. Due to the rapidity of the oscillations of this magnetic flux, the camshaft is rapidly heated uniformly on the surface. By means of an automatic timing mechanism, the inductor is de-energized when the cam is heated to the desired degree. Coincident with or prior to the de-energization of the inductor, streams of a coolant, preferably water, are directed forcibly against the heated portion of the camshaft from quench pipes 17. Rotation of the camshaft continues during the quenching operation. At the conclusion of the quenching operation, the timing mechanism discontinues the flow of coolant.

While the above detailed operations are transpiring, the operator of the machine has been loading a camshaft to be hardened in the idle inductor. This inductor has, of course, been angularly rotated on post 20 so that the camshaft to be hardened will clear the inductor. When the hardening operation has been completed and the idle inductor loaded, the operator moves lever 26 to the opposite side and puts the automatic timer in motion. This energizes the inductor in question and initiates another hardening cycle.

The same movement of lever 26 which moves the unhardened camshaft into the inductor also rotates the opposite work holder 19 on post 20 so that the hardened camshaft can be withdrawn axially from work holder 19 and clear of the inductor. By constant repetition of the above outlined cycle, one operator can feed and unload two work holders without undue effort or idle time.

This invention has been particularly described with reference to camshafts, but it is to be understood that it is not so limited and can readily be adapted to the heat treating or hardening of a large variety of articles.

I claim as my invention:

A camshaft hardening device comprising two U-shaped inductors arranged with the rounded portion of the U-shaped inductors directed towards each other and in a common plane, a pair of fixtures one of which serves one of said inductors and the other of which serves the other of said inductors, each of said fixtures incorporating a driving means, and a hollow member adapted to receive, secure, and rotate a camshaft, means connecting the driving means and hollow member, each of said fixtures being pivotable about an axis parallel to the plane of the inductors, perpendicular to the axis of the hollow member and parallel to each other, said fixtures being connected by a manually operated linkage located intermediate said fixtures and arranged to alternately move a camshaft mounted in one of said fixtures into heating relationship with the inductor and away from the inductor while the camshaft mounted in the other fixture is respectively moved away from the other inductor and into heating relationship with the other inductor.

FREDRICK J. GROVEN.

REFERENCES CITED

The following references are of record in the file of this patent:

UNITED STATES PATENTS

| Number | Name | Date |
|---|---|---|
| 1,915,047 | Blakeslee | June 20, 1933 |
| 1,981,629 | Northrup | Nov. 20, 1934 |
| 2,003,855 | Fredrickson | June 4, 1935 |
| 2,182,820 | Pisarev | Dec. 12, 1939 |
| 2,238,082 | Somes | Apr. 15, 1941 |
| 2,271,916 | Denneen et al. | Feb. 3, 1942 |
| 2,454,039 | Cox | Nov. 16, 1948 |
| 2,467,746 | Hess | Apr. 19, 1949 |
| 2,483,973 | Goettings | Oct. 4, 1949 |

OTHER REFERENCES

Curtis, "High Frequency Induction Heating," First Edition, 1944 (McGraw-Hill Book Co.), pages 75, 76, 79, 165, 167, 169, 171, 172, 173 and 174.

Automobile Engineer, Jan. 1, 1946, pages 13–19.

Curtis, "How to Design Coils for Induction Heating," American Machinist, Jan. 31, 1946, pages 75–78.